UNITED STATES PATENT OFFICE.

KARL BASIL EDWARDS, OF ELTHAM, LONDON, ENGLAND.

MANUFACTURE OF ARSENICAL COMPOUNDS.

1,424,006.   Specification of Letters Patent.   Patented July 25, 1922.

No Drawing. Original application filed January 26, 1921, Serial No. 440,168. Divided and this application filed October 22, 1921. Serial No. 509,749.

*To all whom it may concern:*

Be it known that I, KARL BASIL EDWARDS, a subject of the King of Great Britain, residing at Corner House, North Park, Eltham, London, England, have invented new and useful Improvements Relating to the Manufacture of Arsenical Compounds, of which the following is a specification.

This application is a division of my application for patent, Serial No. 440,168, filed Jan. 26, 1921.

This invention relates to a process for the manufacture of salts possessing the formula $R_3AsO_2S_2$, $R_3AsOS_3$ where R is an alkali metal or ammonium.

This invention has for its object a process which can be carried out on a large scale in which the yields obtained are quantitative and products can be obtained which are uncontaminated with all forms of trivalent arsenic.

According to this invention salts of the above formula are prepared by the interaction of arsenious oxide with a solution of an alkaline polysulphide. If the proportions present are one molecular equivalent arsenious oxide, three molecular equivalents alkaline monosulphide and one molecular equivalent sulphur, pentavalent arsenic compounds are produced only.

*Example.*

72 parts of crystalline sodium monosulphide are dissolved in two thirds of their weight of water and 6.4 parts of sulphur are added and the mixture boiled until the sulphur is dissolved. The solution is cooled and 19.8 parts of arsenious oxide is added cautiously. A violent reaction takes place and the yellow colour of the solution disappears. The solution is boiled until the arsenious oxide is completely dissolved when the resulting solution should be colourless and clear.

The product produced by this reaction contains equimolecular quantities of the compounds $Na_3AsO_2S_2$ and $Na_3AsOS_3$, and may be evaporated under normal pressure until the product contains about 75% of the combined anhydrous substances and is in the form of a viscous liquid when hot. This evaporated product may be reduced to the anhydrous condition without decomposition by treatment in a suitable apparatus such as a vacuum ball mill dryer, for export, and is an improvement over any other arsenical product for insecticidal purposes.

What I claim is:—

1. A process for the manufacture of salts of the formula $R_3AsO_2S_2$, $R_3AsOS_3$, where R is an alkali metal or ammonium, which comprises treating arsenious oxide with a solution of an alkali polysulphide in the proportions of one molecular equivalent arsenious oxide, three molecular equivalents alkaline monosulphide, and one molecular equivalent sulphur.

2. A process for the manufacture of salts of the formula $R_3AsO_2S_2$, $R_3AsOS_3$, where R is an alkali metal or ammonium, which comprises treating arsenious oxide with a solution of alkaline polysulphide and reducing the salts to an anhydrous condition.

3. A process for the manufacture of salts of the formula $R_3AsO_2S_2$, $R_3AsOS_3$, where R is an alkali metal or ammonium, which comprises treating arsenious oxide with a solution of alkaline polysulphide and reducing the salts to an anhydrous condition by evaporation under reduced pressure.

4. A process for the manufacture of salts of the formula $R_3AsO_2S_2$, $R_3AsOS_3$, where R is an alkali metal or ammonium, which comprises boiling a solution of an alkaline monsulphide with sulphur until the latter is dissolved, cooling the solution, adding arsenious oxide, boiling the solution, and reducing the salts to an anhydrous form by evaporation under reduced pressure.

In testimony that I claim the foregoing as my invention, I have signed my name this 7th day of October, 1921.

KARL BASIL EDWARDS.